United States Patent
Murayama et al.

[11] Patent Number: 5,916,499
[45] Date of Patent: Jun. 29, 1999

[54] METHOD FOR PRODUCING POROUS CARBON MATERIAL PRODUCT

[75] Inventors: Junichi Murayama; Kanji Matsuda; Shujun Shikano; Takehiko Takahashi, all of Tendo; Kazuo Hokkirigawa, Yonezawa, all of Japan

[73] Assignee: Sanwa Yushi Kabushiki Kaisha, Yamagata, Japan

[21] Appl. No.: 08/927,293

[22] Filed: Sep. 11, 1997

[30] Foreign Application Priority Data

Oct. 1, 1996 [JP] Japan .................................. 8-322354

[51] Int. Cl.$^6$ .................................................. C01B 31/02
[52] U.S. Cl. ...................... 264/29.1; 264/29.3; 264/29.6; 264/29.7; 264/344
[58] Field of Search .................................. 264/29.1, 29.3, 264/29.6, 29.7, 344

[56] References Cited

U.S. PATENT DOCUMENTS

| | | | |
|---|---|---|---|
| 3,635,676 | 1/1972 | Sands | 264/29.1 |
| 4,466,932 | 8/1984 | Koyama et al. | 264/29.3 |
| 4,507,272 | 3/1985 | Mullen | 264/29.2 |
| 5,730,916 | 3/1998 | Kunzel et al. | 264/29.7 |

*Primary Examiner*—James Derrington
*Attorney, Agent, or Firm*—Birch, Stewart, Kolasch & Birch, LLP

[57] ABSTRACT

The bran has been less usable and have not been treated as industrial resources. The present invention is a method for producing a porous carbon material product and a hard porous carbon material product which have wide variety of functionalities utilizing such bran which is burned and carbonized stably. The method according to the present invention comprises of the steps of kneading bran with a thermosetting resin and an adequate amount of a solution including an adhesive paste or water, the bran is such as rice bran or wheat bran adjusted grain size; granulating the bran kneaded to predetermined grain size or less; molding the bran granulated in a metal mold by pressurizing and degassing to be a mold; burning and carbonizing the mold detached from the metal mold by heating to desired final burning temperature at a predetermined rate under inactive gas atmosphere or under vacuum; and cooling the mold from the final burning temperature to normal temperature at a predetermined rate.

11 Claims, 3 Drawing Sheets

METHOD FOR PRODUCING POROUS CARBON MATERIAL PRODUCT

BACKGROUND OF THE INVENTION

1. Field of the Invention

The present invention relates to a method for producing a porous carbon material product and a hard porous carbon material product utilizing bran such as rice bran or wheat bran as a raw material. The bran has been less usable and has not been treated as industrial resources.

2. Description of the Related Art

A large amount of chaff rice hulls and chaff is generated as by-products from rice which is a main crop in Japan. Similarly, a large amount of chaff and wheat bran is derived from the crops such as wheat, buckwheat or soybeans. Many of the by-products such as the chaff or the bran derived from the crops are tend to be burned as wastes. However, rice bran is oil-pressed to produce rice bran oil. In addition, the chaff (especially chaff rice hulls) are utilized only partially for a culvert and smoking charcoal, and dry distilled substances distilled during the production process of the smoking charcoal are condensed to be used for an insecticide, an animal repellent, a soil conditioner, a remedy for deematophytosis or the like.

However, most of the bran including defatted bran is merely utilized for agricultural materials such as feed, fungus culture medium or manure. Accordingly, effective utilization of the bran as industrial materials has been investigated.

One utilization is a technology that the bran is carbonized. The carbonization of the bran is implemented by steam baking the bran in a batch on a small scale, or by burning successively in a rotary kiln, multistage fluidized bed furnace or the like on a large scale. However, the bran is very fine powder and have less permeability and thermal conductivity. In addition, oil and fat is included therein a large portion, although an amount thereof is small. Therefore, the bran may be burned out and incinerated. Thus, effective and complete carbonization is difficult, which induce lower economic efficiency. Moreover, obtained carbide is fine and easy to splash, and thus is inconvenient for treating. The above problems prevent positive industrialization. Consequently, the carbide, so-called "charcoal," produced from the bran is utilized as a agricultural soil conditioner, but is not utilized as industrial materials due to its quality and quantity.

SUMMARY OF THE INVENTION

In view of the forgoing, the inventors concerned in manufacturing rice bran oil have been strongly interested in effective utilization of the defatted bran, and have been developed and studied the bran from a various points of view for long years under a collaboration of Yamagata University, Faculty of Engineering, and Yamagata Prefecture Industrial Engineering Center. An object of the present invention is to provide an entirely novel method for producing a porous carbon material product and a hard porous carbon material product which have wide applications and have various functionalities utilizing such the bran which is burned and carbonized stably.

The inventors completed the present invention and succeeded in practical use of the bran. The present invention is a novel method for producing the porous carbon material product and the hard porous carbon material product using the bran such as defatted bran, pulverized chaff rice hulls, wheat bran obtained through grinding wheat into flour, buckwheat hulls or soybean hulls as a raw material. The porous carbon material product and the hard porous carbon material product can be formed into a desired shape easily, and can be applied not only to general materials, for example, building materials such as outer wall materials, furniture and packing materials, but also to mechanical parts such as bearings, as well as conducting materials, heating elements and electronic parts by performing electrolysis purification.

The nature, principle and utility of the invention will become more apparent from the following detailed description when read in conjunction with the accompanying drawings.

DESCRIPTION OF THE PREFERRED EMBODIMENTS

Figure 1:
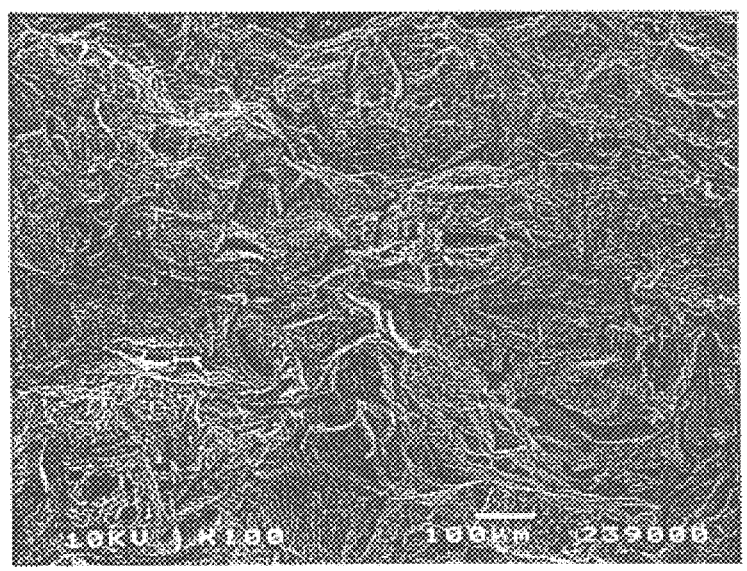
FIG. 1 shows an electron micrograph in 100 magnifications of a section structure of the hard porous carbon material product which is produced using defatted bran as a main raw material.

Preferred embodiments of the present invention will be explained with some examples below.

A method for producing a porous carbon material product of the present invention is fundamentally composed of the following constituents.

The method for producing the porous carbon material product according to the present invention comprises the steps of kneading bran with a thermosetting resin and an adequate amount of a solution including an adhesive paste or water, the bran is rice bran or wheat bran adjusted grain size; granulating the bran kneaded to predetermined grain size or less; molding the bran granulated in a metal mold by pressurizing and degassing to be a mold; burning and carbonizing the mold detached from the metal mold by heating to desired final burning temperature at a predetermined rate under inactive gas atmosphere or under vacuum; and cooling the mold from the final burning temperature to normal temperature at a predetermined rate.

Concretely, the method for producing the porous carbon material product comprises the steps of kneading bran with a thermosetting resin and an adequate amount of a solution including an adhesive paste or water, the bran is rice bran or wheat bran sieved under 20 mesh (unit of sieve opening); granulating the bran kneaded by heating at 60° C. to 80° C. and removing a volatile substance; molding the bran, which is granulated in a sieve with predetermined grain size or less, in a desired metal mold by repeating pressurizing and degassing to be a mold; burning and carbonizing the mold detached from the metal mold by heating to desired final burning temperature at a predetermined rate under inactive gas atmosphere or under vacuum; and cooling the mold from the final burning temperature to normal temperature at a predetermined rate.

Further, the method for producing the hard porous carbon material product comprising the steps of kneading bran with a thermosetting resin and an adequate amount of a solution including an adhesive paste or water, the bran is rice bran or wheat bran adjusted grain size; granulating the bran kneaded under predetermined grain size or less; molding the bran, which is granulated in a sieve with predetermined grain size or less, in a desired metal mold by repeating pressurizing and degassing to be a mold; burning and carbonizing the mold detached from the metal mold by heating at final burning temperature of approximately 700° C. or more at a predetermined rate under inactive gas atmosphere or under vacuum; and cooling the mold from the final burning temperature to normal temperature at a predetermined rate.

Concurrently, the method for producing the hard porous carbon material product comprises the steps of kneading bran with a thermosetting resin and an adequate amount of a solution including an adhesive paste or water, the bran is rice bran or wheat bran sieved under 20 mesh; granulating the bran kneaded by heating at 60° C. to 80° C. and removing a volatile substance; molding the bran, which is granulated in a sieve with predetermined grain size or less, in a desired metal mold by pressurizing and degassing to be a mold; burning and carbonizing the mold detached from the metal mold by heating at final burning temperature of approximately 700° C. or more at a predetermined rate under inactive gas atmosphere or under vacuum; cooling the mold from the final burning temperature to normal temperature at a predetermined rate; and performing electrolysis purification process of the mold in an acid solution.

The bran includes defatted bran which is remained with a large volume after oil-pressing for a production of rice bran oil; wheat bran generated by grinding wheat into flour; chaff rice hulls, buckwheat hulls, soybean hulls, gluten feed (hulls of corn husks or kernels, i.e. residue after producing corn starch) or the like; and powder or pulverized testae generated during processing the bran. The bran should be preferably sieved so as to be at predetermined grain size or less (for example, the bran after defatted is under 12 mesh, most preferably under 20 mesh so as to remove the bran burned in the defatting step or large grains compressed) serving for moldability thereafter and for homogenization of a material structure.

As the thermosetting resin, for example, an amount of approximately 10 to 60 percent by weight of a typical phenol resin is preferably used. Such thermosetting resin is easily mixed with the bran resulting in a smooth agitation. A mixing ratio thereof is different depending on kinds of the bran, therefore the optimum mixing ratio is selected. For example, approximately 5 to 80 percent by weight of the thermosetting resin is mixed with the defatted bran, approximately 5 to 70 percent by weight of the thermosetting resin is mixed with the wheat bran, and approximately 5 to 60 percent by weight of the thermosetting resin is mixed with the gluten feed. Such mixing ratios may be changed depending on conditions of grain size or water content of the bran, material temperature or the like. In case of permeation of the thermosetting resin into the bran is required to be adjusted, various conditions such as an mixing and agitating environment and a setting of left time after the agitation should be considered.

In the mixing and immersing steps of the thermosetting resin, the permeation of the thermosetting resin into the bran and moldability in a metal mold thereafter should be taken into account. In parallel with mixing the thermosetting resin having a predetermined concentration, an adequate amount of water or a solution mixed an adequate amount (for example, in case of the defatted bran, approximately 5 to 30 percent by weight is used) of a binder therein such as various animals and plants adhesive paste, starch, various sugar liquid should be added thereto. Moreover, the solution containing water and the binder should be mixed with the thermosetting resin having the predetermined concentration in advance for obtaining good moldability. The mixed thermosetting resin should be, then, mixed with the bran to agitate.

The bran mixed with the predetermined amount of the thermosetting resin is then heated at approximately 60° C. to 80° C. to remove volatile components and is suitably processed for successive steps. The unprocessed powder mixture may be filled into the metal mold as it is. However, for purposes of obtaining homogeneous filled structures, and degassing smoothly to prevent cracks in the burning step to the utmost, the mixture is preferably granulating using a known granulator such as, for example, a flat type granulator or a tube type granulator, and is sieved to uniform predetermined size, for example under 12 mesh. Then, the mixture is filled into the metal mold prepared for an intended product, and is pressure molded. In the pressure molding, to realize a fine molding status in accordance with intended product properties, a plurality of pressurizing steps are, for example, adopted and degassed every time to obtain a mold thoroughly degassed.

During forming the mold in the metal mold, it is possible to increase strength of the mold especially heated at the final burning temperature of not more than 700° C. by adding a core material such as a reinforcement for stabilizing the shape when detaching the metal mold, as required.

The mold obtained is, then, placed into a stove in a burning step. The burning step must be conducted under no oxygen conditions such as inactive gas, i.e. nitrogen gas, atmosphere or under vacuum so as not to burn the bran and the thermosetting resin of the mold. In addition, a steep temperature increase should be avoided so as not to produce a great amount of decomposed gas from the mold which may cause breakage and cracks. Especially at temperature of approximately 200° C. to 400° C., a large amount of gas is produced accompanying the decomposition. Therefore, a rate of increasing temperature from 200° C. to 400° C. should be fully given attention. For example, in case of the defatted bran, the temperature should be increased at a rate of 1.0° C. to 5.0° C. per minute up to near 500° C. Such increment is determined according to conditions such as an amount of the resin and density of the mold.

The burning temperature is selected in a range from approximately 200° C. to a thousand and several hundreds degree depending on properties, i.e. hardness, purity, porosity, insulation, workability, structural strength or the like, required for a final product. In view of various factors having an influence upon a shape, size, density or the like of the mold, the mold is burned for an optimum period.

For seizing spirits of the porous carbon material product and the hard porous carbon material product produced based on the bran of the present invention having the above-mentioned fundamental constituents, the following Examples will be demonstrated.

EXAMPLE 1

A typical method for producing, especially, a hard porous carbon material product using defatted bran which is the most popular raw material among the bran will be described in the following example.

Mixing Process

The defatted bran extracted oil was sifted through a sieve of 50 mesh. A phenol resin manufactured by Honen Corporation Ltd. in Japan under a trade name "Honen Resingul-px-1600" was used as a thermosetting resin. An amount of 24 percent by weight of the phenol resin was added and fully mixed to/with the sifted defatted bran.

Granulating Process

For a purpose of removing volatile components, the mixture was heated at 80° C., granulated and sifted through a sieve of 12 mesh to be a molding raw material.

Molding Process

A weight of 15 g of the raw material was put into a metal mold having 42 mm in inner diameter and 60 mm in length furnished a heater. The metal mold was heated at 180° C. under a gauge pressure of 300 kg/cm$^2$ using a high pressure jack (cylinder inner diameter is 21 mm). During the process, the metal mold was depressurized several times to a gauge pressure of 70 kg/cm$^2$, and was evacuated water and decomposed gas. A mold was obtained.

Burning Process

The mold was burned in a burning furnace with nitrogen gas flowed. The temperature thereof was increased from room temperature to 250° C. at a rate of 1.2° C./min, from 250° C. to 350° C. at a rate of 1° C./min, from 350° C. to 500° C. at a rate of 1.2° C./min, kept at 500° C. for one hour, then from 500° C. to intended temperature at a rate of 2° C./min, and kept at the intended temperature for 2 hours. Then, the mold was cooled at a rate of 1.5° C./min. In case of the burning temperature is not more than 500° C., the temperature is increased at the above-described rate, kept for 3 hours and then cooled similarly.

EXAMPLE 2

A typical method for producing a porous carbon material product using wheat bran will be described in the following example.

Mixing Process

The wheat bran was sifted through a sieve of 12 mesh. A phenol resin manufactured by Honen Corporation Ltd. in Japan under a trade name "Honen Resingul-px-1600" was used as a thermosetting resin. An amount of 30 percent by weight of the phenol resin was added and fully mixed to/with the sifted wheat bran.

Granulating Process

For a purpose of removing volatile components, the mixture was heated at 80° C., granulated and sifted through a sieve of 12 mesh to be a molding raw material.

Molding Process

Similar to Example 1, a weight of 15 g of the raw material was put into the metal mold furnished a heater. The metal mold was heated at 180° C. under a gauge pressure of 300 kg/cm$^2$ using a high pressure jack. During the process, the metal mold was depressurized several times to a gauge pressure of 70 kg/cm$^2$, and was evacuated water and decomposed gas. A mold was obtained.

Burning Process

The mold was burned in a burning furnace with nitrogen gas flowed under no oxygen condition. The temperature thereof was increased from room temperature to 250° C. at a rate of 1.2° C./min, from 250° C. to 350° C. at a rate of 1° C./min, from 350° C. to 500° C. at a rate of 1.2° C./min, kept at 500° C. for one hour, then from 500° C. to 900° C. at a rate of 2° C./min, and kept at 900° C. for 2 hours. Then, the mold was cooled to room temperature at a rate of 1.5° C./min.

EXAMPLE 3

A typical method for producing a porous carbon material product obtained through burning and carbonizing a gluten feed will be described in the following example.

Mixing Process

The gluten feed was sifted through a sieve of 12 mesh. A phenol resin manufactured by Honen Corporation Ltd. in Japan under a trade name "Honen Resingul-px-1600" was used as a thermosetting resin. An amount of 30 percent by weight of the phenol resin was added and fully mixed to/with the sifted gluten feed.

Granulating Process

For a purpose of removing volatile components, the mixture was then heated at approximately 80° C., granulated and sifted through a sieve of 12 mesh to be a molding raw material.

Molding Process

Similar to Examples 1 and 2, the raw material was molded to be a mold.

Burning Process

Similar to Example 2, the mold was heated and burned at final burning temperature of 900° C. for 2 hours.

In the production method composed of the above-described processes of the present invention, mixing, granulating, molding, burning and cooling processes are essential. In the mixing process, grain size of the main raw material of bran is adjusted to be at least under 12 mesh, preferably under 20 mesh and is kneaded with an adequate amount of solution including an adhesive paste or water added therein. Then, in the granulating process, the grain size of the bran is adjusted under 12 mesh so as to realize a relative elaborate molding using the metal mold and a smooth evacuation in the burning process. Further, in the molding process, the bran is fully evacuated by pressurizing and degassing for a purpose of preventing cracks in the burning process. Thus, a mold is obtained. After detaching the mold from the metal mold, the mold is heated to desired final burning temperature at a predetermined rate under inactive gas atmosphere or under vacuum, burned and carbonized in the burning process. In the cooling process, the mold is cooled from the final burning temperature to room temperature at a predetermined rate. According to the present invention, the bran such as defatted bran can be applied for the first time for producing a porous carbon material product or a hard porous carbon material product as a multi-functional material which are fully available as an industrial material.

Concrete operations of the respective Examples 1 to 3 which are cited as typical production methods of the present invention will be described below.

FIG. 1 shows an electron micrograph of the hard porous carbon material product which is produced using the defatted bran of Example 1 as a main raw material according to the present invention, photographed by Yamagata Prefecture Industrial Engineering Center. The electron micrograph is an enlarged view (100 magnifications) of a partial structure of the product obtained through 900° C. As apparent from the photo, an amount of 30 to 50 per 1 mm$^2$ and sharply outlined voids having approximately a ten and several $\mu$m in width and about 100 $\mu$m in length exist dispersedly on the burned product per square millimeter. Among the voids, some carbon portions including an infinite number of small cavities having several $\mu$m in diameter as a sponge-like structure are recognized. However, most portions of the voids are enclosed with relatively thick carbon portions having fine structures. The carbon portions having fine structures are bent irregularly and exhibit sequential or laminate cubic structures.

Figure 2:
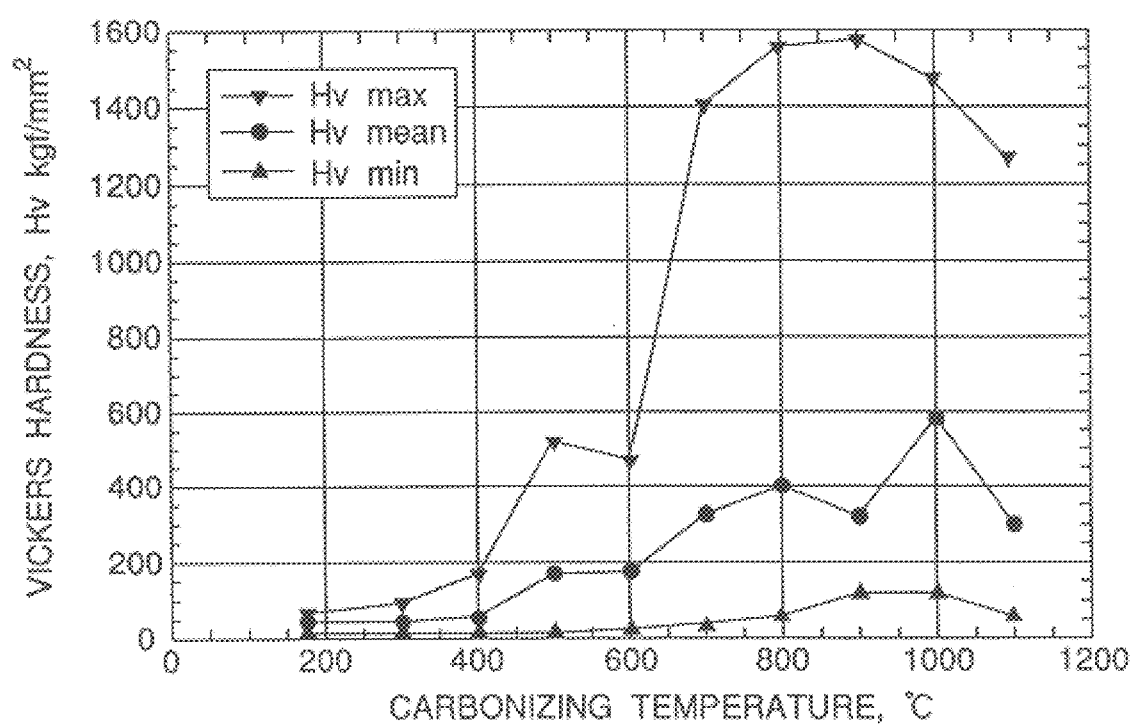
FIG. 2 is a graph showing the relation between Vickers hardness and final burning (carbonizing) temperature of the hard porous carbon material product.

FIG. 2 is a graph showing the relation between Vickers hardness and final burning (carbonizing) temperature of some molds measured by Yamagata University, Faculty of Engineering. The molds were kneaded, patterned, burned until respective final burning temperature under same conditions. Then, the molds were cooled to normal temperature at respective predetermined rates. According to the graph, the hardness is increased with an increase of the burning temperature and is especially increased between 600° C. and 700° C. In case of burning at 600° C. or more, burned products have Vickers hardness of 1400 to 1500 at maximum and not less than 300 in average. Even in the average value, hardness is greater than that of annealed steel or glass type carbon material. At the maximum value, hardness is greater than that of tempering steel or nitriding steel.

Figure 3:
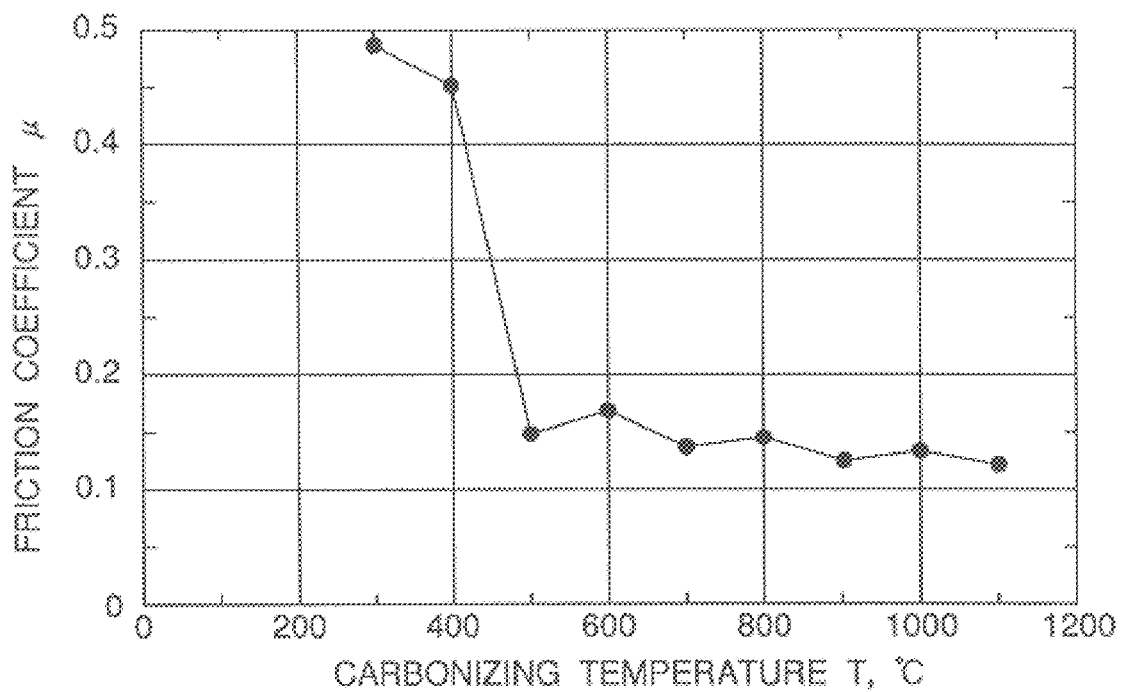
FIG. 3 is a graph showing the relation between friction coefficient and carbonizing temperature of the hard porous carbon material product.

FIG. 3 is a graph showing the relation between friction coefficient and carbonizing temperature of several molds measured by Yamagata University, Faculty of Engineering using a reciprocating friction tester under non-lubricant. The molds were processed similar to those of the above hardness test.

According to the graph, the porous carbon material product and the hard porous carbon material product using defatted bran burned at 500° C. or more have friction coefficient of approximately 0.15, which is remarkable low friction resistance. It reveals that the product can be used as non-lubricant bearing material instead of a bearing.

Figure 4:
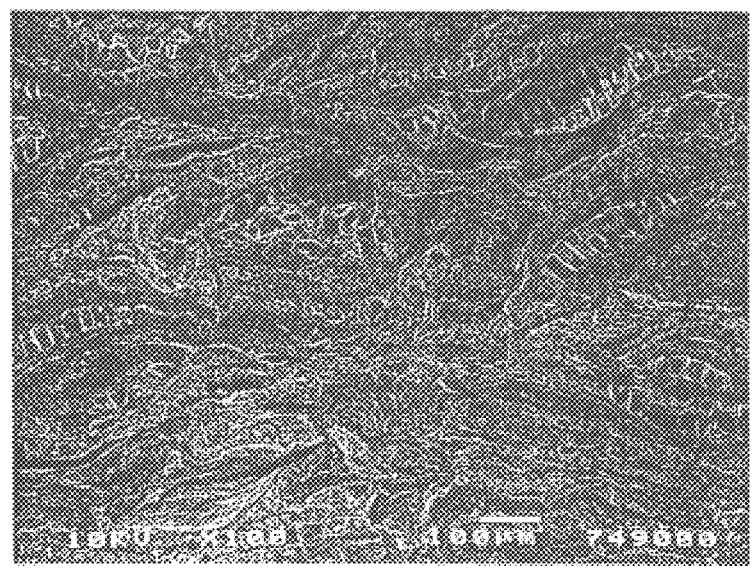
FIG. 4 shows an electron micrograph in 100 magnifications of a section structure of the hard porous carbon material product which is produced using wheat bran as a main raw material.

FIG. 4 shows an electron micrograph in 100 magnifications of the porous carbon material product which is produced using wheat bran as a main raw material according to the present invention, photographed by Yamagata Prefecture Industrial Engineering Center. Compared to Example 1 of FIG. 1, a number of fully emptied voids is small. There are section structures including cell films formed at approximately same intervals in a ladder-like shape on most of the voids, voids where the cell films are destroyed, in other words, which is in a status before fully emptied as Example 1, sponge-like portions and voids which is in a status before forming the cell films. It seems that carbon portions surrounding the voids may be thinner and apparent fineness thereof may be slightly poor compared to those in Example 1, and small cavities exist sporadically on the section structure. However, similar to Example 1, the carbon portions surrounding the voids fully emptied and undeveloped, and the parts in a status before emptied have certainly fine structures. The carbon portions are bent irregularly and exhibit sequential or laminate cubic structures.

Accordingly, compared to Example 1, it seems that the carbon portions surrounding the voids fully emptied and undeveloped, and the parts in a status before emptied have thinner thickness and less fine structures. A percentage of voids including an infinite number of small cavities with several $\mu$m in diameter showing a sponge-like structure is increased. In addition, it is seemed that the sponge-like structure is continued and dispersed in some thick carbon portions of Example 1. With a help of such structural difference, Vickers hardness of the wheat bran measured in the same way of Example 1 is remarkably lower than that of the defatted bran as shown in Table 1. Nevertheless, the average value of the hardness is 156.7 and is higher than that of copper, aluminum and the like. Table 1 shows Vicker hardness data of the materials burned at 900° C.

Figure 5:
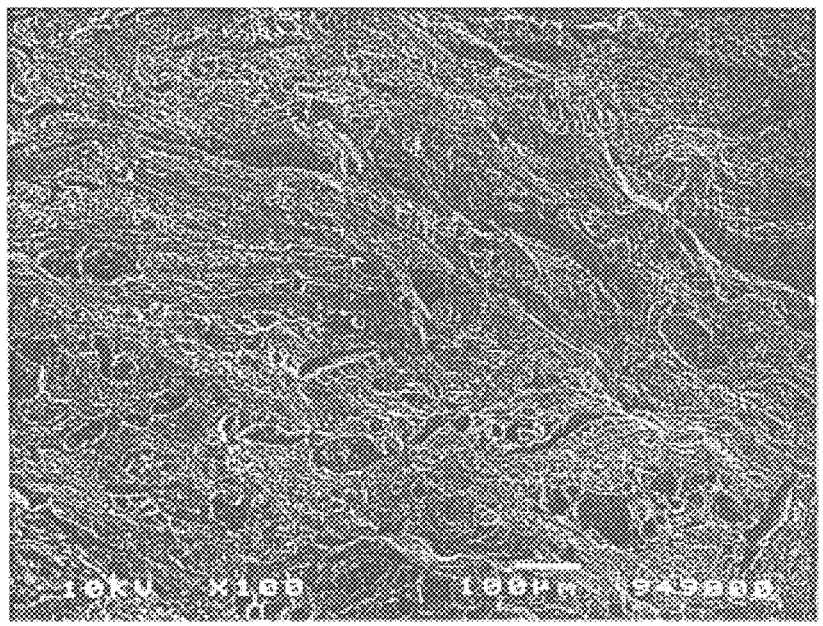
FIG. 5 shows an electron micrograph in 100 magnifications of a section structure of the hard porous carbon material product which is produced using a gluten feed as a main raw material.

FIG. 5 shows an electron micrograph in 100 magnifications of the porous carbon material product which is produced using a gluten feed as a main raw material, photographed by Yamagata Prefecture Industrial Engineering Center.

In this Example, a percentage of voids fully emptied is further decreased compared to Example 2 and most portions which are corresponding to the voids of Example 1 include sponge-like structures. There are also section structures including cell films formed at approximately same intervals in a ladder-like shape thereon. Thus, the thick carbon portions having fine structures occupy only a part thereof. Most parts remain underdeveloped. The portions where the sponge-like structure is continued and dispersed are seemed to be increased. It is not clear that whether or not such section structure affect on Vickers hardness. However, Vickers hardness of the gluten feed is lower than those of Examples 1 and 2 as shown in Table 1. Nevertheless, the average value of the hardness is 116.3 and is higher than that of copper, aluminum and the like.

TABLE 1

| bran used | Vickers hardness | | |
|---|---|---|---|
| | Max. value | Min value | Ave. value |
| defatted bran | 1570.0 | 107.0 | 342.0 |
| wheat bran | 473.0 | 18.7 | 156.7 |
| gluten feed | 244.0 | 30.1 | 116.3 |

Figure 6:
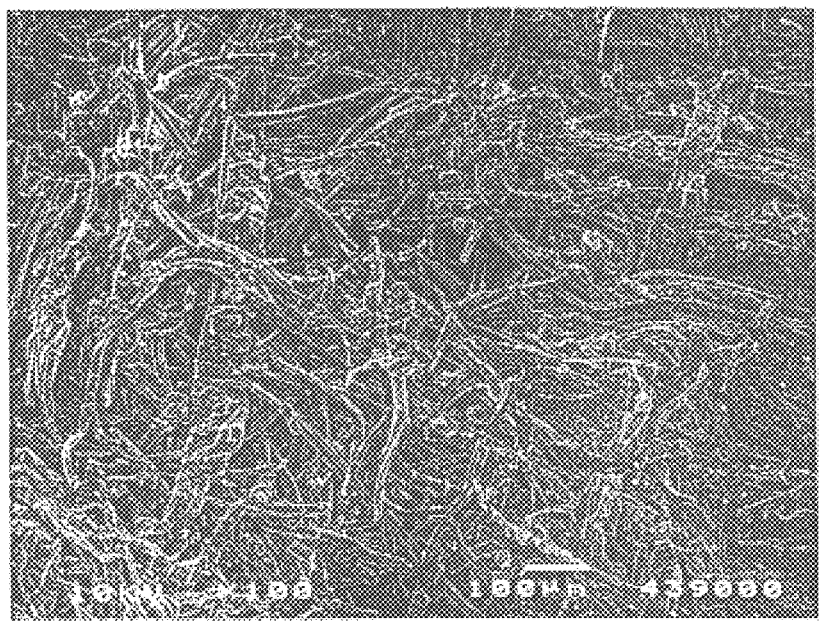
FIG. 6 shows an electron micrograph in 100 magnifications of a section structure of a known hard porous carbon material product which is produced using a wood material (medium fiber board) as a main raw material.

As apparent from the electron micrographs shown in FIGS. 1, 4 and 5 of Example 1 to 3, the porous carbon product and the hard porous carbon product produced by the method according to the present invention are considerably different from conventionally known "porous carbon product obtained through carbonization of a composite material of wood and a thermosetting resin" which is same organic type fiber material. The known porous carbon product is, for example, produced by immersing and injecting the thermosetting resin actively to cells through air holes of cell walls and cell lumens, burning and carbonizing the composite material making the best use of inherent cytoarchtechture, molecular arrangement and composition structure of wood which is a raw material. As a result, decomposition and condensation polymerization of cellulose, hemicellulose, lignin and the like are started to crystallize charcoal tissues locally. Such wood composition structure (vessel, temporary vessel and the like) is almost directly reflected in the final section shape, resulting in carbonized voids among carbon portions having three-dimensionally complex section structure as shown in the electron micrograph in 100 magnifications of FIG. 6, photographed by Yamagata Prefecture Industrial Engineering Center. With a help of such section structural difference, the porous carbon material product and the hard porous carbon product of the present invention have inherent properties, and the hard porous carbon product using the defatted bran as a raw material burned at high temperature of a thousand and several hundreds has, especially, excellent physical properties exceeding the conventional porous carbon product.

Such features in the section structure are obtained by wrapping extra fine bran powder raw material with the thermosetting resin, and an adequate amount of adhesive paste solution or water to bond, by granulating them so as to be in adequate grain size, by filling them into the metal mold and burning and carbonizing them. There may be some factors that influence each other in a complex manner, which does not belong to the wooden raw material. These factors having effects on the features are as follows: the way that the granulated bran, which is filled substantially uniform in the metal mold, is exhausted from the metal mold as gaseous components when heating; dispersion degree of the thermosetting resin for bonding the fine bran powder; fusion with ash such as phosphorus, potassium, silica, magnesium or the like which is originally included in the bran; or the like. Thus, the features of the porous carbon product and the hard porous carbon product of the present invention are significant different depending on kinds and grain size of the bran (the possibility that too fine powder may disappear before carbonizing in the burning step, or too rough powder may highlight bran structures themselves should be considered), kinds of the thermosetting resin added thereto, an additive amount of the adhesive paste solution or water, grain size in granulation, filling degree to the metal mold, a rate of increasing the burning temperature, final burning temperature, burning time or the like. Consequently, it is required to set optimal conditions in accordance with purposes and uses in advance.

As described above, the method for producing the porous carbon material product and the hard porous carbon material product comprises the steps of kneading the bran adjusted grain size (i.e. defatted bran; wheat bran generated by grinding wheat into flour; chaff rice hulls, buckwheat hulls, soybean hulls, a gluten feed and the like; and powder or pulverized testae generated during processing the bran) with the thermosetting resin (especially, a phenol resin) and the adequate amount of the adhesive paste solution or water, granulating them in predetermined size, filling them to the metal mold for molding, burning and carbonizing them at a predetermined rate and cooling them at a predetermined rate to be a burned product. Originally, the bran powder is hard to be treated, even if molded, permeation becomes poor and gas is hard to be exhausted in the burning step causing cracks or damages on the burned product, and thermal conductivity becomes also poor preventing homogeneous burning. The bran powder is, thus, not deemed as industrial materials, or rather is almost waste. However, according to the present invention, such bran powder can be moldable freely and can be applied to sophisticated products having valuable features of adjusting physical properties such as structural stubborn, friction coefficient and expansion coefficient, as well as operation properties such as adsorption ability, adiabatic ability, heat resistance, chemical resistance, whether resistance, current-carrying ability and electromagnetic shield ability.

On the other hand, the conventionally known "porous carbon product obtained through carbonization of a composite material of wood and a thermosetting resin" which is similar organic type fiber material as that of the present invention is produced by immersing and injecting a thermosetting resin to the wood and burning and carbonizing. The conventional product is required to be cut and polished after burning, or even if the wood material is chipped in advance, a finishing step or steps are needed to obtain a fine structure. However, according to the present invention, the porous carbon product and the hard porous carbon product are molded in an extremely easy way, have a distinguished section structure as shown in electron micrographs of FIGS. 1, 4 and 5 which shows the typical products of the present invention, and are usable to industrial materials.

As described above, according to the porous carbon material product and the hard porous carbon material product of the present invention, the bran such as defatted bran; wheat bran generated by grinding wheat into flour; chaff rice hulls, buckwheat hulls, soybean hulls, gluten feed and the like; and powder or pulverized testae generated during processing the bran can be effectively used as industrial materials applicable for wide variety of ranges. These products have a possibility to branch out into the field utilizing conventional ceramics materials, which are expensive and have less workability. Therefore, these products can be appreciated by not only bran processors capable of widen the range of their work, but also industrial manufacturer, general users and farmers being trouble with the bran.

It should be understood that many modification and adaptations of the invention will become apparent to those skilled in the art and it is intended to emcompass such obvious modification and changes in the scope of the claims appended hereto.

What is claimed is:

1. A method for producing a porous carbon-inorganic composite material comprising the steps of:

kneading a defatted rice bran having an adjusted grain size, with a thermosetting resin and an adequate amount of a solution including an adhesive paste or water;

granulating the defatted rice bran kneaded to a predetermined grain size;

molding the defatted rice bran granulated in a metal mold by pressurizing and degassing to prepare a molded product;

burning and carbonizing the molded product to prepare a carbonized product detached from the metal mold by heating to a desired final burning temperature at a predetermined rate under inactive gas atmosphere or under vacuum, and cooling the carbonized product to normal temperature at a predetermined rate.

2. The method according to claim 1, wherein the molded product is heated from room temperature to 250° C. at a rate of 1.2° C./min, from 250° C. to 350° C. at a rate of 1° C./min, from 350° C. to 500° C. at a rate of 1.2° C./min, kept at a final burning temperature of 500° C. for 3 hours in the burning and carbonizing step under inactive gas atmosphere or under vacuum and cooled to normal temperature at a rate of 1.5° C./min in the cooling step.

3. The method according to claim 1, wherein said predetermined grain size is 12 mesh and said desired final burning temperature is 500° C.

4. The method according to claim 3, wherein the granulating step is performed by heating up to 80° C.

5. A method for producing a porous carbon-inorganic composite material product comprising the steps of:

kneading a defatted rice bran sieved under 20 mesh with a thermosetting resin and an adequate amount of a solution including an adhesive paste or water;

granulating the defatted rice bran kneaded by heating at 60° C. to 80° C. and removing a volatile substance;

molding the bran, which is granulated and sieved in a sieve with predetermined grain size, in a desired metal mold by repeating pressurizing and degassing to prepare a molded product;

burning and carbonizing the molded product to prepare a carbonized product detached from the metal mold by heating to a desired final burning temperature at a predetermined rate under inactive gas atmosphere or under vacuum, and cooling the carbonized product from the final burning temperature to normal temperature at a predetermined rate.

6. A method according to claim 5, wherein the molded product is heated from room temperature to 250° C. at a rate of 1.2° C./min, from 250° C. to 350° C. at a rate of 1° C./min, from 350° C. to 500° C. at a rate of 1.2° C./min, kept at final burning temperature of 500° C. for 3 hours in the burning and carbonizing step under inactive gas atmosphere or under vacuum and cooled to normal temperature at a rate of 1.5° C./min in the cooling step.

7. A method for producing a hard porous carbon-inorganic composite material comprising the steps of:

kneading a defatted rice bran having an adjusted grain size with a thermosetting resin and an adequate amount of a solution including an adhesive paste or water;

granulating the bran kneaded to a predetermined grain size;

molding the bran, which is granulated and sieved in a sieve with predetermined grain size, in a desired metal mold by repeating pressurizing and degassing to prepare a molded product;

burning and carbonizing the molded product to prepare a carbonized product detached from the metal mold by heating at a final burning temperature of approximately 700° C. or more at a predetermined rate under inactive gas atmosphere or under vacuum, and cooling the carbonized product from the final burning temperature to normal temperature at a predetermined rate.

8. The method according to claim 7, wherein the molded product is heated from room temperature to 250° C. at a rate of 1.2° C./min, from 250° C. to 350° C. at a rate of 1° C./min, from 350° C. to 500° C. at a rate of 1.2° C./min, kept at final burning temperature of 500° C. for 2 hours in the burning and carbonizing step under inactive gas atmosphere or under vacuum and cooled to normal temperature at a rate of 1.5° C./min in the cooling step.

9. The method according to claim 7, wherein the bran is defatted and the kneading step is performed by adding phenol resin to the defatted bran to obtain an amount of 24 percent by weight.

10. A method for producing a hard porous carbon material product comprising the steps of:

kneading a defatted rice bran sieved under 20 mesh with a thermosetting resin and an adequate amount of a solution including an adhesive paste or water;

granulating the bran kneaded by heating at 60° C. to 80° C. and removing a volatile substance;

molding the bran, which is granulated and sieved in a sieve with predetermined grain size, in a desired metal mold by pressurizing and degassing to prepare a molded product;

burning and carbonizing the molded product to prepare a carbonized product detached from the metal mold by heating at a final burning temperature of approximately 700° C. or more at a predetermined rate under inactive gas atmosphere or under vacuum;

cooling the carbonized product from the final burning temperature to normal temperature at a predetermined rate; and electrolyzing the carbonized product in an acid solution.

11. The method according to claim 10, wherein the molded product is heated from room temperature to 250° C. at a rate of 1.2° C./min, from 250° C. to 350° C. at a rate of 1° C./min, from 350° C. to 500° C. at a rate of 1.2° C./min, kept at final burning temperature of 500° C. for 2 hours in the burning and carbonizing step under inactive gas atmosphere or under vacuum and cooled to normal temperature at a rate of 1.5° C./min in the cooling step.

* * * * *